United States Patent
Kasapi et al.

(10) Patent No.: US 9,917,655 B1
(45) Date of Patent: Mar. 13, 2018

(54) TIMING-MODULATED SIDE CHANNEL

(71) Applicant: nusemi inc., Mountain View, CA (US)

(72) Inventors: Athanasios Kasapi, San Francisco, CA (US); Stefanos Sidiropoulos, Palo Alto, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/342,075

(22) Filed: Nov. 2, 2016

Related U.S. Application Data (60) Provisional application No. 62/249,650, filed on Nov. 2, 2015.

(51) Int. Cl.
| | | |
|---|---|---|
| *H04L 27/36* | (2006.01) |
| *H04L 27/38* | (2006.01) |
| *H04B 14/00* | (2006.01) |
| *H04L 1/00* | (2006.01) |
| *H04L 25/03* | (2006.01) |
| *H04L 29/08* | (2006.01) |

(52) U.S. Cl.
CPC ......... *H04B 14/004* (2013.01); *H04L 1/0018* (2013.01); *H04L 25/03273* (2013.01); *H04L 27/365* (2013.01); *H04L 69/323* (2013.01)

(58) Field of Classification Search
CPC ...... H03M 1/82; H04L 25/49; H04L 25/4902; H04L 27/365
See application file for complete search history.

(56) References Cited

U.S. PATENT DOCUMENTS

| | | | | |
|---|---|---|---|---|
| 6,154,484 A | * | 11/2000 | Lee | H04B 1/69 370/495 |
| 2008/0170643 A1 | * | 7/2008 | Lee | H03M 9/00 375/340 |
| 2012/0195347 A1 | * | 8/2012 | Beeler | H04B 1/707 375/141 |
| 2012/0206429 A1 | * | 8/2012 | Lee | H04L 25/4902 345/211 |

* cited by examiner

*Primary Examiner* — David S Huang
(74) *Attorney, Agent, or Firm* — McDermott Will & Emery LLP (57) ABSTRACT

Physical-layer information is conveyed within a packetized communication network via a timing-modulated side channel to yield low-latency physical interface control without consuming host-layer signaling bandwidth. Multi-modal transceivers at opposite ends of a signaling link optionally communicate to confirm mutual support and signaling headroom for timing-modulated information exchange before transitioning from an in-band feedback mode to a side-channel feedback mode.

22 Claims, 6 Drawing Sheets

FIG. 1 Multi-Modal Media-Layer Data Transfer

FIG. 2 Dynamic Signaling-Mode Control

TIMING-MODULATED SIDE CHANNEL

CROSS REFERENCE TO RELATED APPLICATIONS

This nonprovisional application hereby claims priority to and incorporates by reference U.S. Provisional Application No. 62/249,650, filed Nov. 2, 2015 and entitled "Method and Apparatus for a Timing-Modulated Side Channel."

TECHNICAL FIELD

The present disclosure relates to network communications.

BACKGROUND

Physical-layer feedback is occasionally merged into the host-layer information stream conveyed between Ethernet transceivers. Aside from bandwidth loss (consuming payload bandwidth otherwise available to transmit host-layer information), the "PHY" feedback typically percolates through the Ethernet protocol stacks of both the sender and receiver, yielding a relatively slow feedback loop. Moreover, the bottom-of-stack PHY layers at the feedback source and end points typically communicate directly with the top-of-stack application layer to initiate and conclude the feedback path, complicating the otherwise orderly flow of information between protocol layers. Further, the volume and type of PHY-layer feedback is typically constrained by the Ethernet standard itself, restricting development of more robust PHY-layer management.

DRAWINGS

The various embodiments disclosed herein are illustrated by way of example, and not by way of limitation, in the figures of the accompanying drawings and in which like reference numerals refer to similar elements and in which.

DETAILED DESCRIPTION

In various embodiments disclosed herein, physical-layer information is conveyed within a packetized communication network via a timing-modulated side channel to yield low-latency physical (PHY) interface control without consuming host-layer bandwidth. In a number of embodiments, multi-modal transceivers at opposite ends of a signaling link communicate to confirm mutual support and signaling headroom for timing-modulated information exchange before transitioning from an in-band feedback mode to a side-channel feedback mode. In other embodiments, link transceivers may be designed to support timing phase/frequency adjustment above and beyond that specified by the pertinent standard, ensuring headroom for timing-modulated side-channel communication regardless of channel characteristics. In a number of embodiments, communications according to the Ethernet standard is assumed. In all cases, the various techniques and embodiments disclosed may readily be employed within virtually any type of standardized or proprietary communications links.

Figure 1:
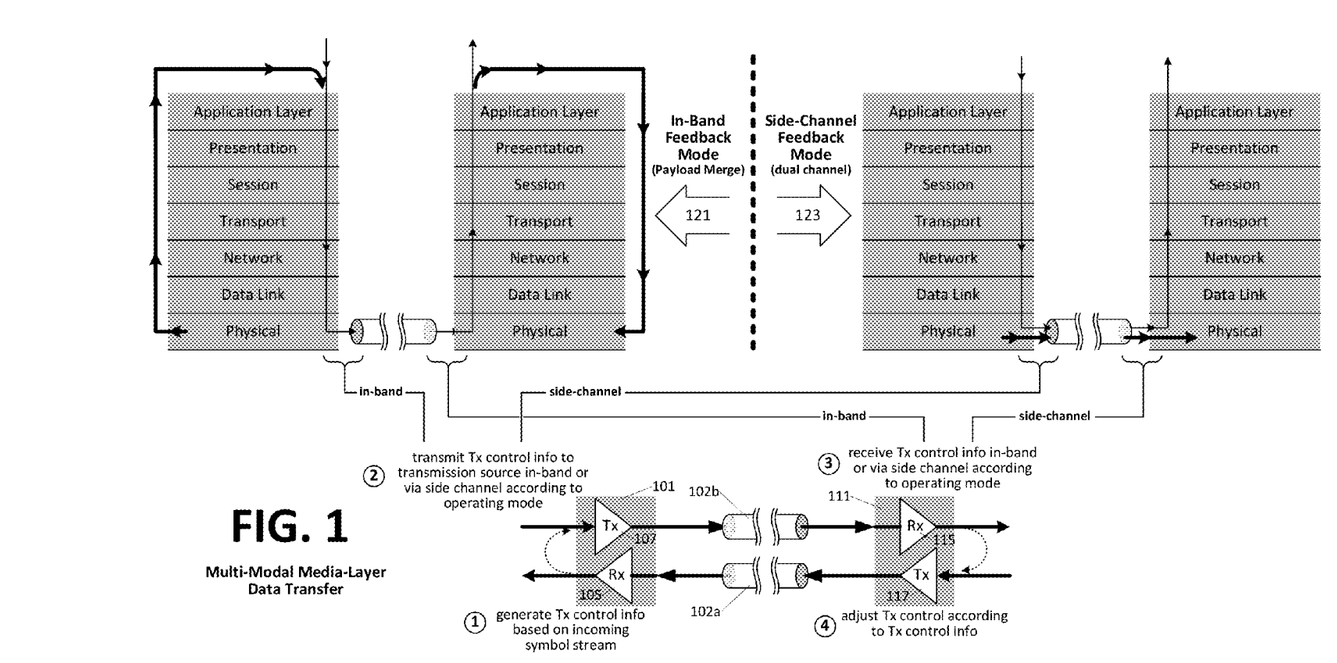
FIG. 1 illustrates exemplary physical-layer feedback within counterpart multi-mode Ethernet transceivers.

FIG. 1 illustrates exemplary physical-layer feedback within counterpart multi-mode Ethernet transceivers 101, 111 implemented according to embodiments detailed herein. As shown, transceiver 101 includes a receiver 105 and transmitter 107 coupled to counterpart transmitter 117 and receiver 115 of transceiver 111 via respective signaling links 102a and 102b, with each transmitter outputting a respective symbol stream (i.e., bearing packetized information) to be received by the counterpart receiver.

Starting with the enumerated operation shown at (1), receiver 105 generates, based on the incoming symbol stream, physical signaling control information (PHY layer information) to be fed back to remote transmitter 11 including, for example and without limitation, information for adjusting or setting transmit pre-emphasis taps or tap weights, information for controlling output driver operation (e.g., signaling strength, offset adjust, etc.), transmit timing adjust information, or any other information useful for controlling physical signaling output from transmitter 117. Depending on the feedback mode, the PHY-layer control information is delivered to and output by transmitter 107 either in-band within the application-layer packet stream or via a timing-modulated side channel as shown at (2), and thereafter recovered accordingly (in-band or via side-channel) at remote receiver 115 as shown at (3) and supplied to transmitter 117 to implement the specified transmit-signaling adjustments (4).

Still referring to FIG. 1, exemplary information flows for the in-band and side-channel PHY-layer feedback modes are shown at 121 and 123, respectively. Starting with in-band mode 121, physical-layer feedback is merged into the host-layer payload stream at the transmit side and thus transmitted within the payload stream (i.e., transmitted in-band) and then extracted from the application-layer payload stream at the receive side. To implement this in-band feedback path (i.e., PHY-layer feedback transmitted within the payload stream and thus consumes a portion of the payload bandwidth), information is communicated from the physical-layer to the application layer at the transmit side and then from the application layer to the physical layer at the receive side, in both cases circumventing intermediate layers of the protocol stack (which is depicted according to a seven-layer open systems interface (OSI), though various other protocol stacks may be implemented). Once merged within the host-layer data stream, the feedback propagates through the protocol stack—adding latency to the PHY-to-PHY feedback path and consuming a portion of the payload bandwidth otherwise available for application-layer content.

In side-channel feedback mode, payload transmit timing is modulated to form an independent symbol stream path and thus a timing-modulated side channel within the same signaling link (102a and/or 102b) that implements the host-layer payload channel (the "main" channel). In the embodiment shown in FIG. 1, the side-channel is instantiated within the PHY layer and used to directly convey information between counterpart PHY layers, though the side-channel may be more generally used to convey information between counterpart media-layers (physical, data link, network), between counterpart host-layers (transport, session, presentation, application) or even between layers at different points within the protocol hierarchy on either side of the signaling link (e.g., from physical layer at the transmitting node to data-link layer in receiving node).

Figure 2:
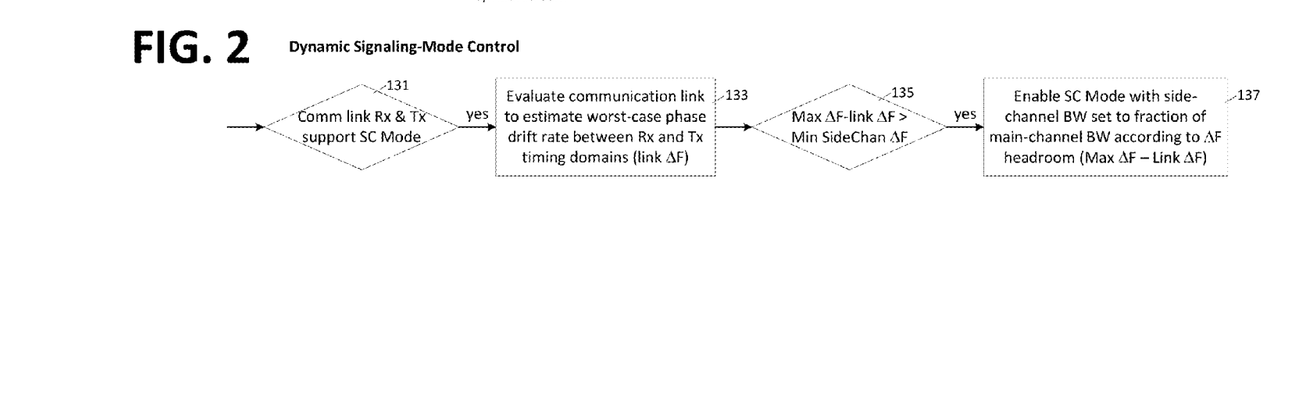
FIG. 2 illustrates an exemplary operational sequence for establishing or switching between the in-band and side-channel feedback modes shown in FIG. 1.

FIG. 2 illustrates an exemplary operational sequence for establishing or switching between the in-band and side-channel feedback modes shown in FIG. 1. Starting at 131, the link transceivers communicate via in-band mode (e.g., in accordance with relevant Ethernet standard or other standard or pre-agreed communication protocol) to determine whether both transceivers (or at least one receiver and counterpart transmitter) support side-channel (SC) feedback mode. If side-channel mode is supported (affirmative determination at 131), the transceivers evaluate the communication link at 133 to estimate (or measure or otherwise determine or ascertain) the worst-case rate of drift between the receiver and transmitter timing domains on either side of the link and thus an estimation of the peak frequency difference, "Link $\Delta F$," between the two timing domains. At 135, the maximum end-to-end frequency delta permitted by the relevant standard (Max $\Delta F$) is compared with the link frequency delta to determine whether sufficient frequency-delta headroom exists to implement a timing-modulated side-channel. If sufficient headroom exists (e.g., Max $\Delta F$–Link $\Delta F$>Minimum $\Delta F$ required for side-channel implementation and thus affirmative determination at 135), the transceivers enable side-channel feedback mode at 137, setting the side-channel bandwidth to a fraction of the main-channel bandwidth (i.e., bandwidth allocated to conveyance of packetized host-layer payloads) in accordance with the available timing-modulation headroom. In one embodiment, for example, the side-channel (SC) symbol transmission rate is set to 1:N to effect timing-modulated transmission of one side-channel symbol for every N main-channel symbols. The main-channel/side-channel symbol ratio (N) may be dynamically adjusted over time according to occasional sampling of the frequency-delta headroom and/or other information indicating that the frequency-delta headroom may be diminished or increased (e.g., determining that the host device or system of which either or both of the transceivers are constituents is in motion, operating on battery power subject to more rapidly changing environmental conditions, etc. or conversely, that such components are at rest, operating on line power, disposed within environmentally stable environments, etc.). Alternatively, the main-channel/side-channel symbol ratio (i.e., effectively a ratio of the signaling bandwidths of the two channels) may be fixed at a predetermined or programmed value (e.g., N=100). In either case, the side-channel may be dynamically enabled and disabled according to actual or anticipated changes in frequency delta headroom. In alternative embodiments, in-band feedback mode may be omitted altogether (i.e., PHY transceivers exchange feedback exclusively via timing-modulated side-channel), or the PHY layers may initialize (e.g., power-up or reset) into side-channel feedback mode, transitioning to in-band feedback mode only when compelled by insufficient frequency-delta headroom and/or instruction from higher layers of the protocol stack.

Figure 3:
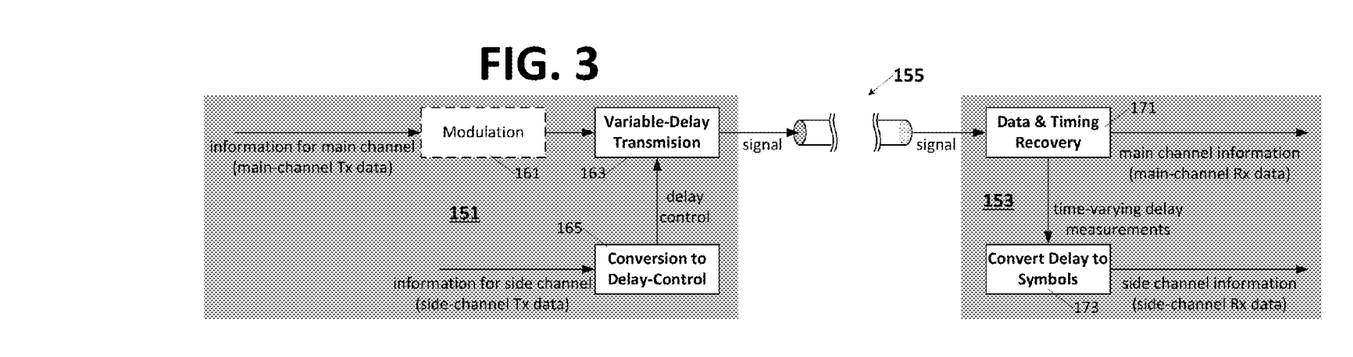
FIG. 3 illustrates embodiments of a transmitter and receiver that simultaneously implement main-channel and side-channel signaling over a signaling medium.

FIG. 3 illustrates embodiments of a transmitter 151 and receiver 153 (both of which may be components of respective transceivers) that simultaneously implement main-channel and side-channel signaling over medium 155. In the embodiment of FIG. 3 and others discussed below, signaling medium 155 is assumed to be a wired signaling link (e.g., implemented by circuit board traces, cables, fiber optic waveguide, etc., any of which may be modeled as transmission lines), though other media may be used in all cases, including free space or dielectric materials through which electromagnetic fields may propagate with or without intentional confinement (i.e., wireless signaling or waveguide transmission). In the case of wireless signaling, in particular, information to be conveyed via the main channel—main-channel transmit (Tx) data—may be applied to modulate a carrier waveform at 161 (e.g., amplitude, frequency and/or phase modulation of a carrier), with the carrier frequency chosen according to the spectrum(s) allocated to the radio transmission. In other embodiments, particularly where the main-channel transmit data is to be conveyed over wired signaling links, carrier modulation component 161 may be omitted and the main channel information conveyed directly as a baseband symbol stream, with each symbol encoded via pulse-amplitude modulation, pulse-width modulation, phase modulation, or any combination thereof. For ease of understanding, binary-encoded NRZ (non-return-to-zero) main-channel signaling is assumed with respect to embodiments discussed below with each main-channel symbol encoded as one of two nominal symbol voltage levels (amplitudes), referred to herein as +1, −1 (equivalent logically to logic '1' and '0' or vice-versa). In general, the binary NRZ encoding (a pulse-amplitude modulation or PAM waveform) may be implemented within variable-delay transmission element 163 as discussed below, though modulation element 161 may alternatively carry out all or part of the PAM encoding. Various other signal encoding schemes (e.g., return-to-zero, multi-level PAM, etc.) may be used in alternative embodiments.

Still referring to FIG. 3, side channel information ("side-channel transmit data") is supplied to a digital-to-delay converter element 165 to provide a delay control value to variable-delay transmission element 163. Variable-delay transmission element, in turn, modulates the transmit timing of the main channel transmit data (implementing or receiving 2-PAM main-channel symbols, for example) to transmit both the main-channel symbol stream and a timing-modulated side-channel symbol stream via medium 155. At receiver 153, a data and timing recovery element 171 samples the incoming waveform to recover the main channel information ("main-channel receive data") and to supply time-varying delay measurements representative of the side-channel transmit data to a delay-to-symbol converter element 173. The delay-to-symbol converter element, in turn, outputs a stream of recovered side-channel symbols ("side-channel receive data").

Figure 4:
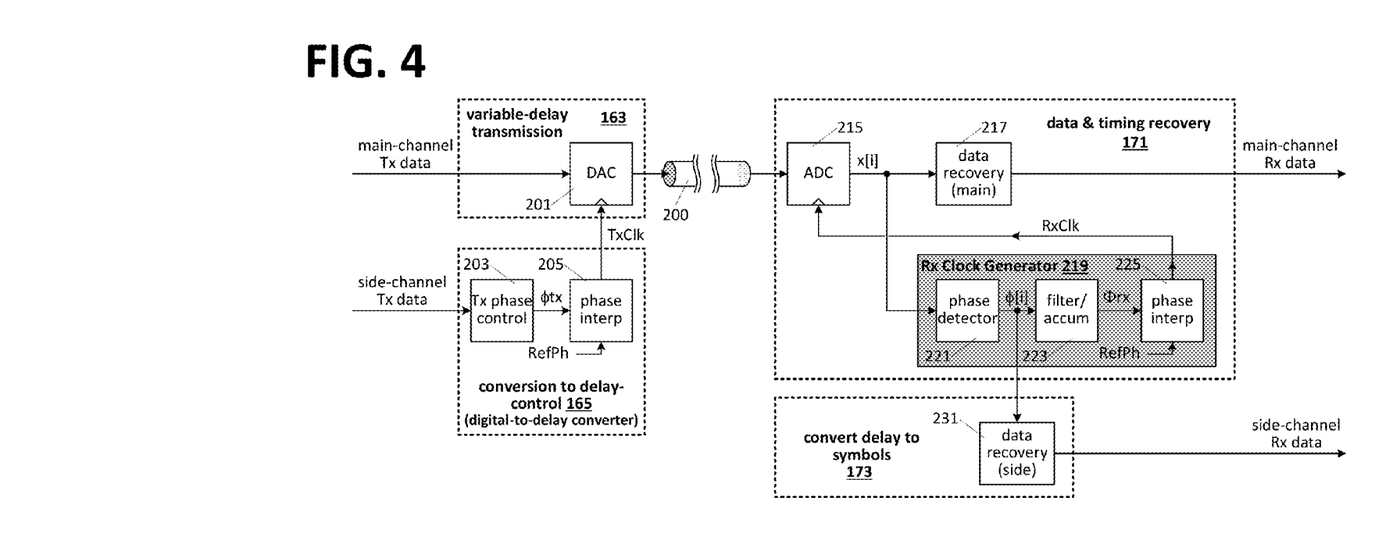
FIG. 4 illustrates a more detailed embodiment of the dual-channel signaling arrangement shown in FIG. 3.

FIG. 4 illustrates a more detailed embodiment of the dual-channel signaling arrangement shown in FIG. 3, showing correspondence with all FIG. 3 elements except for optional modulation element 161 which may be omitted or viewed as being merged into variable-delay transmission element 163. In the depicted implementation, a digital-to-analog converter (DAC—implemented within transmit-side variable-delay transmission element 163) converts main-channel transmit data into analog voltage outputs (e.g., 2-PAM, 4-PAM, etc.) in response to a transmit clock signal, thus transmitting main-channel symbols over link 200 during respective unit-intervals (i.e., symbol-valid intervals) marked by transitions (e.g., rising edges, falling edges, or both rising and falling edges) of the transmit clock. In digital-to-delay-converter 165, a transmit-phase control element 203 receives the side-channel transmit data stream and generates a sequence of transmit-phase values ($\phi tx$) in response. The transmit phase values are supplied to a phase interpolator 205 to control the interpolation between reference clock phases (RefPh), thereby generating a phase-modulated (or timing-modulated) timing signal that is supplied to DAC 201 as the aforementioned transmit clock signal.

Figure 5A:
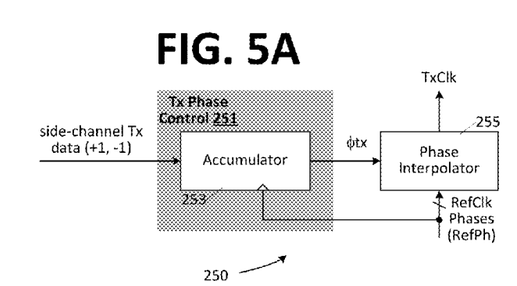
FIG. 5A illustrates a more detailed embodiment of a digital-to-delay converter that may be used to implement the digital-to-delay converter shown in FIG. 4.
Figure 5B:
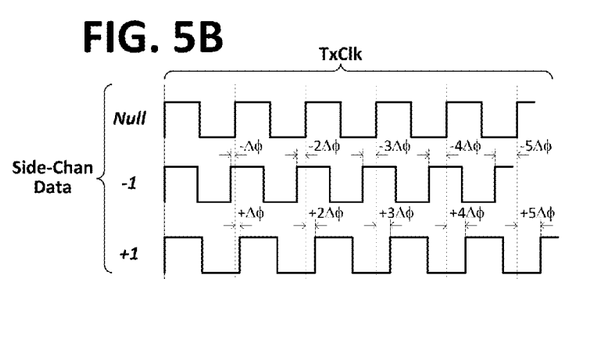
FIG. 5B illustrates an exemplary timing-modulated transmit clock waveform generated within the digital-to-delay converter of FIG. 5A.

FIGS. 5A and 5B illustrate a more detailed embodiment of a digital-to-delay converter 250 that may be used to implement the like-named element of FIG. 4 and an exemplary timing-modulated transmit clock waveform generated therein. In the particular implementation shown, converter 250 includes a transmit phase controller 251 and phase interpolator 255 interconnected generally as shown in FIG. 5A. Phase control module 251 is implemented by an accumulator 253 that ramps a phase control output $\phi tx$ up or down in response to each incoming side-channel symbol (i.e., 1, −1 which correspond to logic '1' and '0' values, or vice-versa). More specifically, assuming that each side-channel symbol is to be transmitted over a continuous sequence of N unit intervals (where N is the main-channel to side-channel symbol ratio), then accumulator 253 will ramp $\phi tx$ positively (ascending from lower value to higher value) in response to '+1' side-channel symbol at a rate according to the accumulator gain (e.g., incrementing a counter by one or more in response to each TxClk edge). A '−1' side-channel symbol will produce a corresponding descending ramp. Assuming that accumulator 253 generates a n-bit modulo output (i.e., $\phi tx$ overflowing from $2^n-1$ to zero and underflowing from zero to $2^n-1$) and that phase interpolator 255 mixes the incoming reference clock phases in accordance with weights $\phi tx$ and $2^n-1-\phi tx$, phase interpolator 255 will incrementally advance the phase of the transmit clock signal through a full clock cycle as the $\phi tx$ value is ramped from 0 to $2^n-1$ and conversely retard the transmit clock phase over a full clock cycle as the $\phi tx$ value is ramped from $2^n-1$ to 0, with $\phi tx$ overflow or underflow being reflected by phase advance/retard into a new clock cycle. FIG. 5B contrasts an exemplary transmit clock waveform that results when no side-channel data is to be transmitted (side-channel data=null) with the clock waveforms generated during transmission of +1 and −1 side channel data symbols. As shown, the cycle-to-cycle phase advance (or decrement) generated in response to side-channel data effectively constitutes a temporary frequency shift by $1/(T+/-\Delta\phi)$, where T is the unmodulated clock frequency. Granularity of the minimum nonzero cycle-to-cycle phase change ($\Delta\phi$) is determined by the bit-depth 'n' of phase control value $\phi tx$ (i.e., $\Delta\phi=2\pi/2^n$ radians).

Figure 6A:
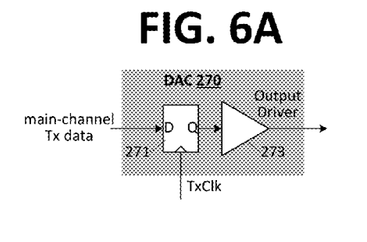
FIGS. 6A and 6B illustrate an embodiment of the DAC shown in FIG. 4, and an exemplary timing waveform generated thereby during conveyance of '1' and '0' (and null) side-channel data values.
Figure 6B:
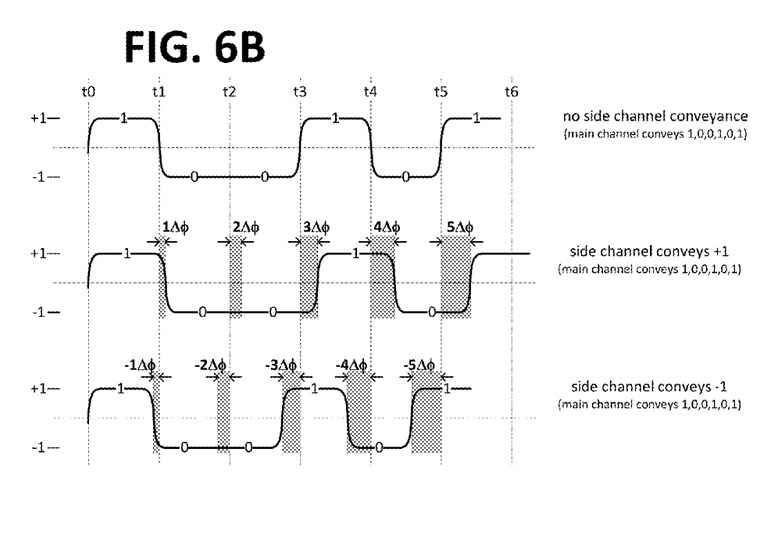

FIGS. 6A and 6B illustrate a 2-PAM embodiment 270 of the DAC shown in FIG. 4, and an exemplary timing waveform generated by DAC 270 during conveyance of '1' and '0' (and null) side-channel data values. Referring first to FIG. 6A, a register element 271 latches an inbound main-channel data value (e.g., a single bit in this example) in response to each transmit clock edge (rising and/or falling), and output driver 273 drives an output line high or low according to the register output (e.g., pulling the line potential up or down in an NRZ implementation, though other types of signal encoding may be used as discussed above, including current-sourcing/sinking arrangements that produce only negligible changes in line voltage). Referring to FIG. 6B, which shows the same '1,0,0,1,0,1' main-channel bit sequence for each of the side-channel data states (no data, +1, −1), the +1 and −1 side-channel timing modulations are reflected in the effective main-channel symbol width as the transmit clock frequency is incrementally increased or decreased (i.e., as shown in FIG. 5B).

Returning to FIG. 4 and referring now to receive-side operation, an analog-to-digital converter (ADC) 215 within data & timing recovery unit 171 samples the incoming signal in response to a receive-clock signal (RxClk) to produce a sequence of digital sample values, x[i], where i=0, 1, 2, 3, etc. The digital sample stream is supplied to a data recovery module 217 to recover the main-channel data (e.g., resolving each sample as a logic '1' or logic '0' main channel data bit according to a decision threshold), and is also supplied to a receive clock generator 219. Receive clock generator 219 itself includes a phase detector 221 which generates a stream of phase values $\phi[i]$ in response to the incoming sample stream; a filter/accumulator 223 which generates a receive-phase output $\Phi rx$ in response to the incoming $\phi[i]$ stream; and a phase interpolator 225 which interpolates between reference clock phases (RefPh) in accordance with $\phi rx$ to produce the receive-clock signal. As explained in greater detail below, phase-detector 221 output indicates a symbol-to-symbol phase deviation with respect to the receive clock signal (or one of the reference clock phases), and is thus provided to a side-channel data recovery module 231 (part of the delay-to-symbol converter 173) to recover side-channel data.

Reflecting on FIGS. 5B and 6B, it can be seen that encoding +1 and −1 side-channel symbols with uniformly positive and uniformly negative cycle-to-cycle TxClk phase changes, respectively, causes the number of main-channel symbols transmitted over a given time interval to vary—a variation that may produce a temporary or prolonged inequality between the supply-rate and transmission rate of main-channel information. A side-channel symbol stream composed of predominantly +1 symbols (i.e., conveyed in extended-duration main channel symbols in the FIG. 5B, 6B examples), for example, may result in main channel symbol transmission at an aggregate data rate lower than required to meet the information supply rate, causing a back-up at the transmitter input. Conversely, a side-channel symbol stream composed of predominantly −1 symbols (e.g., conveyed in shortened-duration main channel symbols) will result in an aggregate main-channel symbol transmission rate greater than the supply rate, eventually requiring a stall to await delivery of main-channel information.

Figure 7A:
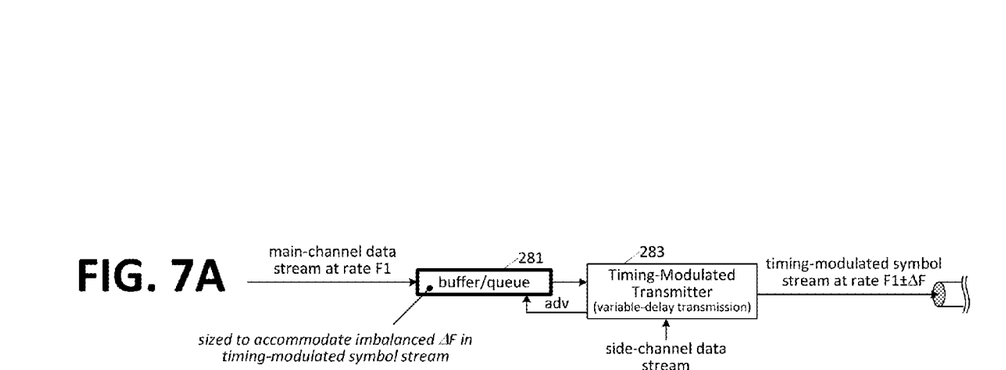
FIGS. 7A-7C illustrate various techniques that may be applied to manage or avoid timing-modulation-induced inequality between main-channel information supply and transmission rates.
Figure 7B:
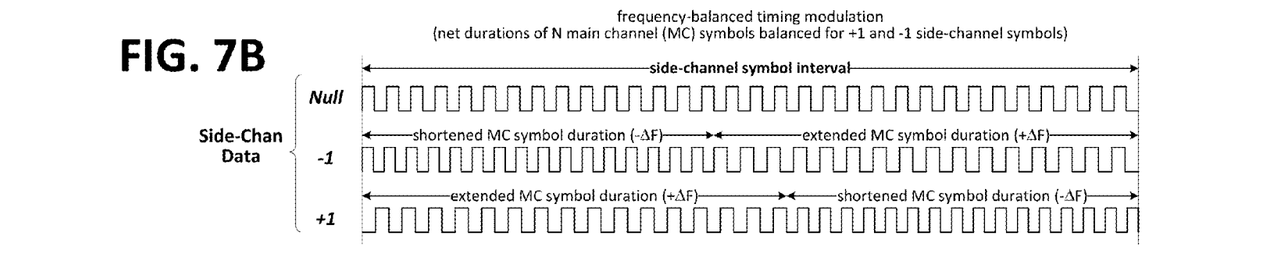
Figure 7C:
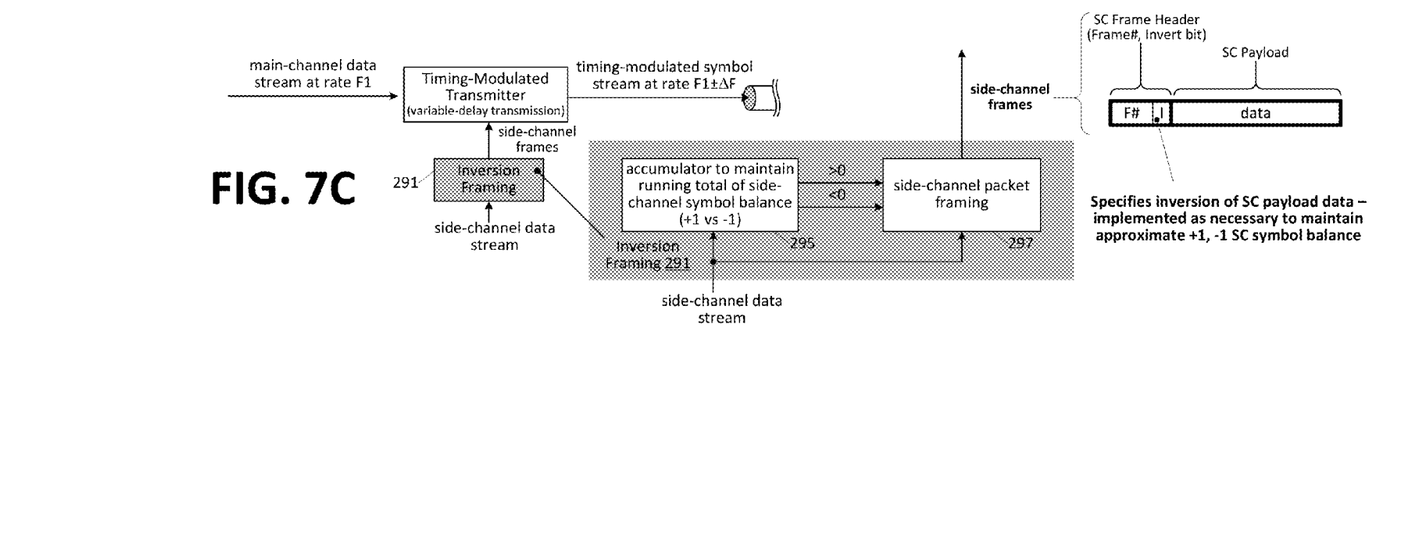

FIGS. 7A-7C illustrate various techniques that may be applied to manage or avoid timing-modulation-induced inequality between main-channel information supply and transmission rates. Starting with FIG. 7A, in one embodiment, the main-channel information stream is buffered within a storage queue element 281 sized to accommodate imbalance between main-channel information delivery and transmission rates. As shown, a timing-modulated transmitter 281 (e.g., implemented as shown in FIGS. 6A and 6B) outputs an advance signal ("adv") to storage queue 281 to advance the main-channel information therein (e.g., progressing to the next quantum of main-channel data to be encoded within the outgoing main-channel symbol), thus controlling the rate of main-channel data progression through the storage queue. Information may be loaded at the tail of storage queue 281 according to the delivery rate so that the quantity of queued main-channel information grows and shrinks as the frequency of the timing-modulated main-channel symbol stream temporarily falls below and rises above the queue-fill rate. In one embodiment, the storage queue 281 is sized to accommodate a worst-case side-channel symbol imbalance (i.e., predominance of +1 or −1 side-channel symbols) over a given interval, with higher-layers within the communication protocol stack (e.g., Ethernet protocol stack) stalling data delivery for back-ups beyond the anticipated worst case.

FIG. 7B illustrates an alternative frequency-balancing approach in which side-channel symbol encoding is itself temporally balanced so that the time intervals required to transmit +1 and −1 side-channel symbol (and the total number of duration-modulated main-channel symbols transmitted during that time interval) are uniform. That is, the number of main-channel symbols transmitted during the side-channel-symbol interval is the same regardless of side-channel symbol value so that the aggregate (or average) main-channel symbol transmission rate remains fixed at the main-channel information delivery rate, regardless of the side-channel information content. In the particular example shown, modulation of the durations of the N main-channel symbols conveyed during a side-channel symbol interval is split, with N/2 main-channel symbols transmitted with shortened durations and N/2 main-channel symbols transmitted with extended durations. In the depicted embodiment, side-channel symbol values (e.g., +1, −1) are distinguished by the order in which the shortened and extended main-channel symbols are received, though other types of encoding techniques may be used (e.g., sandwiching N/2 long-duration symbols between two sets of N/4 short-duration symbols to convey a +1 side-channel symbol and, conversely, sandwiching N/2 short-duration symbols between two sets of N/4 long-duration symbols to convey a −1 side-channel symbol (or vice-versa)). Observing that framing of each side-channel symbol becomes important (i.e., important to know where the symbol starts and ends), a sequence of start and/or stop symbols may be used to mark the beginning of a side-channel transmission, thus providing for end-to-end synchronization that ensures correct side-channel symbol recovery. Various other synchronization schemes may also be used.

FIG. 7C illustrates yet another frequency-balancing approach in which side-channel symbols are transmitted in frames that permit payload data (i.e., the side-channel information of interest) to be selectively inverted as necessary to balance the net quantity of +1 and −1 side channel symbol transmissions. As shown, side-channel information is supplied to an inversion framing element 291 that maintains a running/accumulated total of side-channel symbol values within accumulator 295 and thus an indication of the relative number of +1 and −1 side-channel symbols that have been supplied for transmission. If the accumulated total indicates a predominance of +1 or −1 side-channel values, accumulator 295 asserts an overflow signal (">0") or underflow signal ("<0"), respectively, to a side-channel packet framing element 297. Packet framing element 297 loads a predetermined or programmable volume of side-channel information within a packet payload and determines, based on predominance of +1 or −1 symbols within each payload and the status of the underflow/overflow signals whether to invert the payload content, setting an "inversion" flag ('I') in the packet header accordingly. For example, upon framing a payload predominated by +1 side-channel symbols, packet framing element 297 may invert the contents of the payload (and so indicate by setting the inversion flag within the packet header) in response to an overflow indication from accumulator 295 (refraining from such inversion if the accumulator indicates underflow). Conversely, upon framing a payload predominated by −1 side-channel symbols, packet framing element 297 may invert the payload contents in response to an underflow indication from accumulator 295 (refraining from inversion in response to overflow indication). The packet header may be marked by a predetermined bit pattern and/or convey other information (e.g., frame number as shown, frame length, etc., in addition to the inversion indicator shown) as useful for side-channel data recovery. Though not shown, the packet may also include a trailer (e.g., conveying error detection information such as checksum information, cyclic redundancy check information or the like). Further in embodiments where the trailer is used to mark the end-of-packet and thus the boundary between successive packets (e.g., as in the case of a CRC value), the packet header may be omitted altogether and the inversion indicator placed within the trailer.

Referring to FIGS. 7A-7C generally, various additional or alternative approaches to accommodating or compensating for potential frequency imbalance between main-channel information delivery and transmission rates may be employed. Also, variations of the approaches shown in FIGS. 7A-7C may be combined. For example, the buffering technique shown in FIG. 7A may be implemented to accommodate short-term overflow/underflow, while inversion framing (i.e., as shown in FIG. 7C) is executed to avoid imbalance beyond the buffering capability. Alternatively, the balanced timing modulation scheme shown in FIG. 7B may be employed with a variant of the framing technique shown in FIG. 7C (e.g., framing without inverting to ensure correct symbol boundary interpretation at the signal receiver). Moreover, in all cases, counterpart symbol recovery may be executed by the remote receiver to recover side-channel data (e.g., detecting symbol encoding as shown in FIG. 7B, packet payload extraction in the context of the FIG. 7C framing, etc.).

Figure 8A:
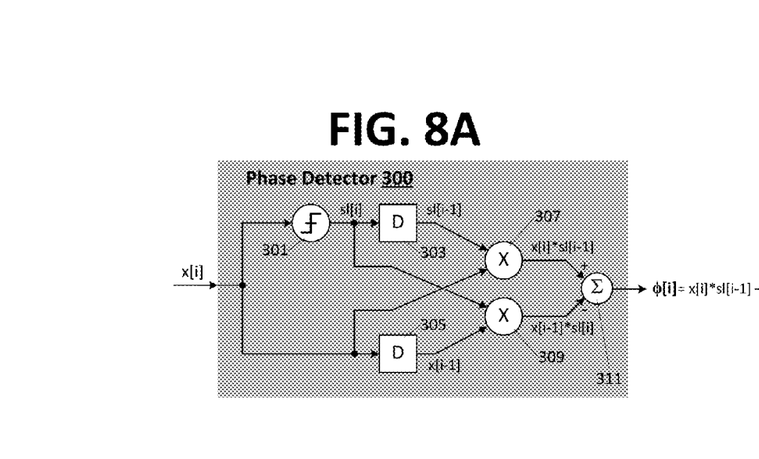
FIGS. 8A and 8B illustrate an embodiment of a phase detector and exemplary phase detect values generated therein.
Figure 8B:
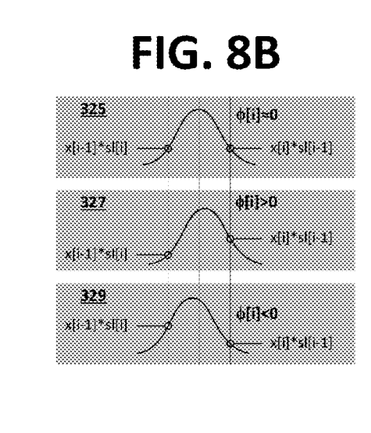

FIGS. 8A and 8B illustrate an embodiment of a phase detector 300 (e.g., that may be used to implement phase detector 221 of FIG. 4) and exemplary phase detect values generated therein. As shown, each incoming sample x[i] is supplied to a slicer 301 which generates a corresponding digital "slice" value sl[i] (e.g., −1 or +1), with both the slicer output and input sample (x[i]) supplied to respective delay elements 303 and 305. In one embodiment, the delay elements are implemented by clocked registers (or latch elements) having outputs that reflect their inputs after a symbol time delay (i.e., unit-interval delay). Accordingly, by multiplying the output of slice register 303 with the succeeding sample value within multiplier 307 to yield x[i]*sl[i−1], and by multiplying the output of sample register 305 with the preceding slice value within multiplier 309 to produce x[i−1]*sl[i], respective measures of the contribution of leading and trailing samples to a given slice are obtained. Assuming that each main-channel symbol is temporally dispersed as it propagates across the channel (i.e., causing so-called intersymbol interference (ISI)) and is sampled by the receiver-side ADC at its precise temporal midpoint, the contributions from trailing and leading samples (which also spread temporally during channel propagation) would approximately balance, so that their difference (generated within summing circuit 311) would be zero. This is shown by the phase alignment at 325 in FIG. 8B, in which the leading and trailing symbol contributions to the current symbol are balanced and thereby yield a zero-valued average phase value ($\phi[i]$ averages to zero) at the output of summing circuit 311. By contrast, if the symbol sampling instant is late or early relative to the ideal midpoint, the contribution of the trailing-symbol sample (x[i]) within the sample-slice products (i.e., outputs of multipliers 307 and 309) will be greater than or less than that of the leading-symbol sample (x[i−1]), so that summing circuit 311 will generate a positive or negative average phase value ($\phi[i]>0$ or $\phi[i]<0$, on average, as shown at 327 and 329), respectively, with a magnitude according to the phase offset (lateness or early-ness) between the actual and ideal sampling instants.

Figure 9:
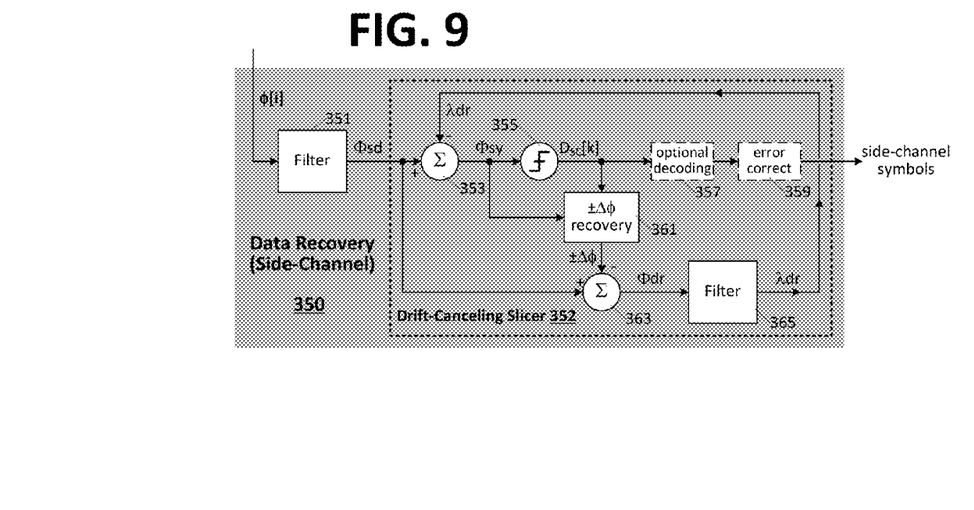
FIG. 9 illustrates an exemplary side-channel data recovery module coupled to receive the stream of phase values generated by the phase detector of FIG. 8A.

FIG. 9 illustrates an exemplary side-channel data recovery module (e.g., capable of implementing data recovery unit of FIG. 4) coupled to receive the stream of phase values $\phi[i]$ generated by the phase detector of FIG. 8A. In the embodiment shown, a digital low-pass filter 351 (e.g., an infinite impulse response filter, though a finite impulse response filter may also be used) generates a filtered phase offset value, $\Phi sd$, that reflects contributions from both side-channel timing modulation and intrinsic sources of phase drift, supplying the filtered phase offset value to a drift-canceling slicer 352.

Drift-canceling slicer 352 generates a measure of the intrinsic phase drift ($\lambda dr$) within the incoming waveform (i.e., phase change absent side-channel modulation), subtracting that intrinsic-drift value from the filtered phase offset within summing circuit 353 to yield a phase value $\Phi sy$ ostensibly representative of a side channel symbol. The side-channel symbol phase is sliced in slicer 355 (e.g., compared with a digital threshold in a binary-slice embodiment to ascertain over/under status) to yield a recovered side-channel data value ($D_{SC}[k]$) or, optionally, one or more data bits that are supplied to optional decoding and/or error correction blocks (357, 359) to produce a recovered side-channel symbol. In either case, the output of slicer 355 is supplied to a delta-phase recovery element 361 that generates filtered estimates of the +1 and −1 side-channel phase-change contributions, $\pm\Delta\phi$. The side-channel phase-change estimates are subtracted from the raw filtered phase offset value in summing circuit 363 to yield a nominally unfettered estimate of the intrinsic phase drift—that is, an estimate or measure of the phase drift ($\Phi dr$) that would have been present even without side-channel timing modulation. As shown, the intrinsic phase drift estimate is filtered within filter element 365 to produce the intrinsic phase drift value $\lambda dr$ applied within summing circuit 353.

Figure 10:
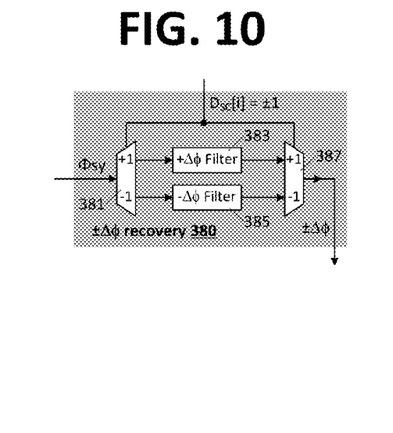
FIG. 10 illustrates embodiment of a delta-phase recovery element that may be used to implement delta-phase recovery element of FIG. 9.

FIG. 10 illustrates embodiment of a delta-phase recovery element 380 that may be used to implement delta-phase recovery element 361 of FIG. 9. As shown, the incoming side-channel symbol phase value is demultiplexed (381) to separate positive and negative phase-shift filters 383 and 385 according to the slicer symbol decision. That is, depending on whether a given side-channel symbol phase is resolved (by slicer 355 of FIG. 9) as a +1 or a −1, the side-channel symbol phase value is supplied to positive phase-shift filter 383 or negative phase-shift filter 385 to generate respective low-pass-filtered estimates of symbol to symbol phase shift contributions imparted by the +1 and −1 side-channel timing modulation. Multiplexer 387 similarly responds to the slicer output by selecting the output of the positive phase-shift filter or the negative phase-shift filter to be output as the delta-phase value ($+\Delta\phi$) to be subtracted from the filtered phase offset value, $\Phi sd$, in summing circuit 363 of FIG. 9 (i.e., and thereby produce the intrinsic phase drift estimate, $\Phi dr$).

Figure 11A:
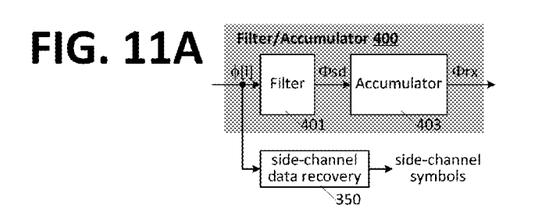
FIGS. 11A and 11B illustrate alternative embodiments of a filter/accumulator that may be used to implement the filter/accumulator of FIG. 4, emphasizing different tap-points for side-channel data recovery.
Figure 11B:
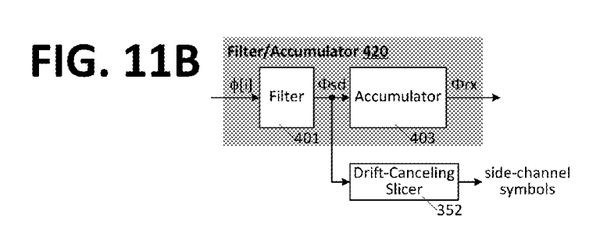

FIGS. 11A and 11B illustrate alternative embodiments of a filter/accumulator that may be used to implement the filter/accumulator of FIG. 4, emphasizing different tap-points for side-channel data recovery. In the embodiment of FIG. 11A, filter accumulator 400 receives the stream of phase values $\phi[i]$ generated by the phase detector of FIG. 8A and includes a digital low-pass filter 401 (e.g., IIR or FIR) to produce a filtered phase offset value, $\Phi sd$. Accumulator 403 accumulates a phase control value $\Phi rx$ according to the $\Phi sd$ input, ramping the phase control value up or down in response to a steady-positive or negative filtered phase offset, respectively, and thereby tracking the temporary frequency delta imparted by side-channel timing modulation as well as accounting for intrinsic phase drift. In an embodiment where filter 401 effects the same filtering operation as filter 351 of FIG. 9 (e.g., same type of low-pass filter and same or similar filtering coefficients), the two filtering operations (i.e., implemented respectively in filter 401 in FIG. 11A and filter 351 in FIG. 9) may be implemented within a single filter instance, yielding the arrangement shown in FIG. 11B in which side-channel recovery devolves to the operation of the drift-canceling slicer 352 described above.

Figure 12:
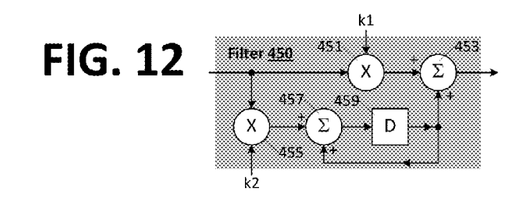
FIGS. 12 and 13 illustrate exemplary implementations of a low-pass filters that may be used to implement filters described herein.
Figure 13:
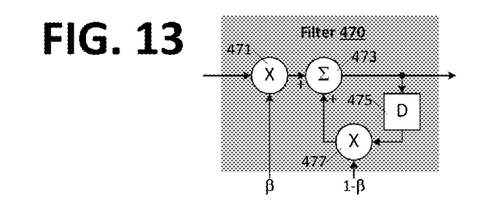

FIGS. 12 and 13 illustrate exemplary implementations of a low-pass filter 450 and 470 that may be used to implement a number of the filters described above. Referring first to FIG. 12, which reflects an IIR filter that may be used to implement filter 401 in FIGS. 11A and 11B, a digital input is multiplied by a scaling factor k1 within multiplier 451 and then summed in summing circuit 453 with a running total of prior input values (i.e., from register element 459) to produce the filter output, in effect averaging the input value with prior inputs to reduce high-frequency variation in the filtered output. As each new input value arrives, another scaled version of the input value generated by multiplier 455 is summed with the running total in summing circuit 457 and then loaded into register 459 to update the running total.

Filter 470 of FIG. 13 is an exemplary IIR filter that may be used to implement filter 365 within the drift-canceling slicer of FIG. 9. In the embodiment shown, the incoming digital value scaled by factor $\beta$ within multiplier 451 and then added within summing circuit 453 with a scaled accumulated total (content of register 475 multiplied by $1-\beta$ within multiplier 477) to produce and output an updated filter output. At the conclusion of each cycle, as a new digital value is provided at the filter input, the content of register 475 is loaded with the updated filter output. Various other filtering configurations may be used to implement either or both of the filters shown in FIGS. 12 and 13 in alternative embodiments. For example, a FIR filter may be implemented instead of an IIR filter in either case, with the various filters within the overall signaling system implemented exclusively by FIR filters or IIR filters, or by a combination of FIR and IIR filters.

Figure 14:
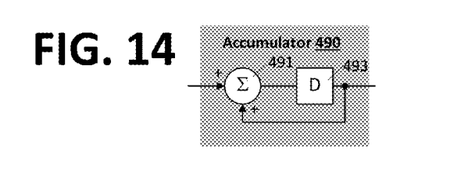
FIG. 14 illustrates an embodiment of an accumulator.

FIG. 14 illustrates an embodiment of an accumulator 490 that may implement any of the accumulator components discussed above. As shown, the incoming digital input is summed (491) with the accumulator output from register 493, producing a value to be clocked or strobed into register 493 as the updated accumulator output as the next digital input arrives.

Figure 15:
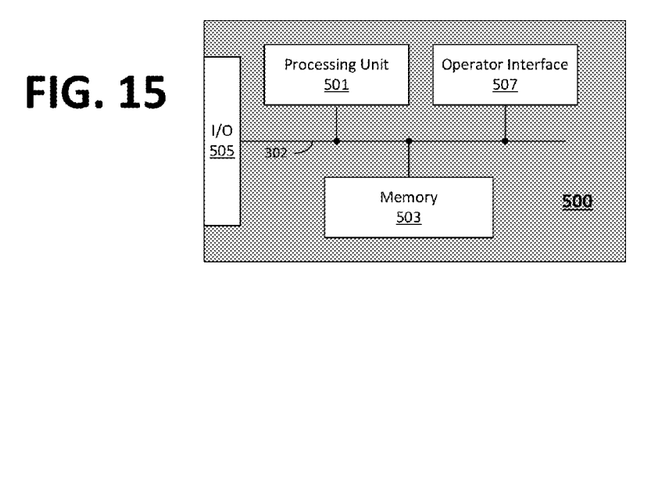
FIG. 15 illustrates a generalized embodiment of an appliance (or system, device, apparatus, etc.) for implementing various embodiments of a timing-modulated side channel as described herein.

FIG. 15 illustrates a generalized embodiment of an appliance 500 (or system or device, which may be a mobile or wall-powered device) for implementing various embodiments of a timing-modulated side channel as described above (e.g., on either or both sides of a communication channel). As shown, appliance 500 includes a processing unit 501 formed by one or more general purposes or special purpose processors, memory 503 for storing program code executed by the processing unit to effect the various methods and techniques of the above-described embodiments, and also to buffer data streamed through the appliance.

Appliance 500 further includes one or more input and/or output (I/O) ports 505 that include transceivers for receiving and outputting main-channel symbols and media-layer (or PHY layer) feedback according to the various techniques discussed above (e.g., multi-modal operation, including timing-modulated side-channel). Various components of I/O ports 505, including all or part of the transceivers therein may be implemented by program code execution within processing unit 501 and/or dedicated digital-signal-processing hardware.

Appliance 500 also includes an optional user interface 507 to present and receive information to a human or artificial operator and thus enable operator control of the timing-modulation function (e.g., set configuration, programmable values, etc.) as well as to interact with the appliance in a manner intended by its core function. Though not shown, numerous other functional blocks may be provided within the appliance according to its core function (and the appliance itself may be a component in a larger host appliance or network of appliances). Further, the functional blocks are depicted as being coupled by a communication path 502 which may include any number of shared or dedicated buses or signaling links. More generally, the functional blocks shown may be interconnected in a variety of different architectures and individually be implemented by a variety of different underlying technologies and architectures. With regard to the memory architecture, for example, multiple different classes of storage may be provided within memory 503 to store different classes of data. For example, non-volatile storage media such as fixed or removable magnetic, optical, or semiconductor-based recording media may be provided to store executable code and related data (or receivable within such system to enable receipt of such executable code and related data), while volatile storage media such as static or dynamic RAM for storing variable data.

The various timing-modulation methods and techniques disclosed herein may be implemented through execution of one or more a sequences of instructions (i.e., software program(s)) within the processing unit 501 or by dedicated hardware (with such dedicated hardware optionally being implemented within an application-specific integrated circuit (ASIC), programmable gate array (PGA) or field-programmable gate array (FPGA)), or any combination thereof. If a purely hardware-based implementation is provided, processing unit 501 and related circuitry may be omitted from appliance 500 if not needed for execution of other functions.

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special purpose or general purpose computer system or consumer electronic device or appliance, such as the system, device or appliance described in reference to FIG. 15. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

The various circuits, modules, units, elements or other functional components disclosed herein may also be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, the term "module" or "element" or "unit" or the like as used herein refers broadly to one or more components implemented by dedicated hardware, programmed processor(s), or any combination of dedicated hardware and programmed processor(s).

Any of the specific memory or storage sizes, signal path widths, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Device or component "programming" can include, for example and without limitation, loading a control value into a register or other storage circuit within the device or component in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device or component. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within a signal transmitter, the method comprising:
    transmitting a first stream of symbols via an external signaling link; and
    modulating durations of the symbols in the first stream to convey a second stream of symbols via the external signaling link, the second stream of symbols being independent from the first stream of symbols.

2. The method of claim 1 wherein transmitting the first stream of symbols comprises transmitting the symbols of the first stream in response to a transmit timing signal, and wherein modulating the durations of the symbols in the first stream to convey a second stream of symbols comprises modulating transition times of the transmit timing signal.

3. The method of claim 2 wherein modulating the transition times of the transmit timing signal comprises shifting the phase of the transmit timing signal by one or more predetermined phase increments in successive cycles of the transmit timing signal to convey a first symbol of the second symbol stream.

4. The method of claim 1 wherein modulating the durations of the symbols in the first stream to convey the second stream of symbols comprises rendering the duration of each symbol in the first stream to be one of a plurality of possible durations that correspond to respective symbols of the second stream of symbols.

5. The method of claim 1 wherein modulating the durations of the symbols in the first stream to convey the second stream of symbols comprises extending respective durations of multiple consecutive symbols in the first stream to convey a symbol representative of a first logical value within the second stream and shortening respective durations of multiple consecutive symbols in the first stream to convey a symbol representative of a second logical value within the second stream.

6. The method of claim 1 wherein transmitting the first stream of symbols via the first external signaling link comprises conveying the first symbols via the first external signaling link at a first signaling rate according to a frequency of a transmit timing signal and wherein modulating durations of the symbols in the first stream to convey the second stream of symbols via the external signaling link comprises conveying the second symbols at a second symbol rate that is substantially lower than the first symbol rate.

7. A signal transmitter comprising:
    a digital-to-analog converter to transmit a first stream of symbols via an external signaling link; and
    a digital-to-delay converter that modulates durations of the symbols in the first stream to convey a second stream of symbols via the external signaling link, the second stream of symbols being independent from the first stream of symbols.

8. The transmitter of claim 7 wherein the digital-to-analog converter to transmit the first stream of symbols comprises circuitry to transmit the symbols of the first stream in response to a transmit timing signal, and wherein the digital-to-delay converter that modulates durations of the symbols in the first stream to convey a second stream of symbols comprises circuitry to modulate transition times of the transmit timing signal.

9. The transmitter of claim 8 wherein modulating the durations of the symbols in the first stream to convey the second stream of symbols comprises rendering the duration of each symbol in the first stream to be one of a plurality of possible durations that correspond to respective symbols of the second stream of symbols.

10. The transmitter of claim 7 wherein the digital-to-delay converter that modulates durations of the symbols in the first stream to convey the second stream of symbols comprises circuitry to render the duration of each symbol in the first stream to be one of a plurality of possible durations that correspond to respective symbols of the second stream of symbols.

11. The transmitter of claim 7 wherein the digital-to-delay converter that modulates durations of the symbols in the first stream to convey the second stream of symbols comprises circuitry to extend respective durations of multiple consecutive symbols in the first stream to convey a symbol representative of a first logical value within the second stream and to shorten respective durations of multiple consecutive symbols in the first stream to convey a symbol representative of a second logical value within the second stream.

12. A method of operation within a signal receiver, the method comprising:
    sampling an external signaling link in response to a receive timing signal to generate digital samples of a signal transmitted on the external signaling link by a counterpart transmitter;

resolving each of the digital samples into a respective data value to recover a first stream of symbols conveyed within the signal transmitted by the counterpart transmitter; and detecting, based at least in part on the digital samples, variations in durations of constituent symbols of the first stream to recover a second stream of symbols conveyed within the signal transmitted by the counterpart transmitter.

13. The method of claim 12 wherein detecting variations in durations of constituent symbols of the first stream comprises detecting a frequency difference between the receive timing signal and a transmission rate of the symbols within the first stream.

14. The method of claim 12 further comprising adapting a frequency of the receive timing signal based on the detected variations in symbol durations.

15. The method of claim 12 wherein detecting, based at least in part on the digital samples, variations in durations of constituent symbols of the first stream of symbols comprises evaluating two or more successively generated ones of the digital samples to detect a phase offset between a transition of the receive timing signal and a temporal midpoint of a symbol within the first stream of symbols.

16. The method of claim 12 wherein resolving each of the digital samples into a respective data value to recover the first stream of symbols conveyed within the transmitted signal comprises recovering symbols of the first stream at a first symbol rate, and wherein detecting variations in durations of constituent symbols of the first stream to recover the second stream of symbols conveyed within the transmitted signal comprises recovering symbols of the second stream at a second symbol rate that is substantially lower than the first symbol rate.

17. A signaling interface comprising:
a sampling circuit that samples a first external signaling link in response to a receive timing signal to generate digital samples of a signal transmitted on the first external signaling link by a first transmitter;
a first data recovery circuit that resolves each of the digital samples into a respective data value to recover a first stream of symbols conveyed within the transmitted signal; and
a second data recovery circuit that detects, based at least in part on the digital samples, variations in durations of constituent symbols of the first stream to recover a second stream of symbols conveyed within the transmitted signal.

18. The signaling interface of claim 17 wherein the second data recovery circuit that detects variations in durations of constituent symbols of the first stream comprises circuitry to detect a frequency difference between the receive timing signal and a transmission rate of the symbols within the first stream.

19. The signaling interface of claim 17 further comprising clock recovery circuitry to adapt a frequency of the receive timing signal based on the detected variations in symbol durations.

20. The signaling interface of claim 17 wherein the second data recovery circuit that detects, based at least in part on the digital samples, variations in durations of constituent symbols of the first stream of symbols comprises a phase detector to evaluate two or more successively generated ones of the digital samples to detect a phase offset between a transition of the receive timing signal and a temporal midpoint of a symbol within the first stream of symbols.

21. The signaling interface of claim 17 wherein the first data recovery circuit that resolves each of the digital samples into a respective data value to recover the first stream of symbols conveyed within the transmitted signal comprises circuitry to recover symbols of the first stream at a first symbol rate, and wherein the second data recovery circuit that detects variations in durations of constituent symbols of the first stream to recover the second stream of symbols conveyed within the transmitted signal comprises circuitry to recover the symbols of the second stream at a second symbol rate that is substantially lower than the first symbol rate.

22. The signaling interface of claim 17 further comprising a second transmitter to output data onto a second signaling link, and wherein the second stream of symbols comprises information to control operation of the second transmitter.

* * * * *